Oct. 29, 1946. S. A. LOUKOMSKY ET AL 2,410,385
PLASTOMETER
Filed April 5, 1945 6 Sheets-Sheet 1

INVENTORS
SERGE A. LOUKOMSKY,
CHARLES R. STOCK,
BY
ATTORNEY

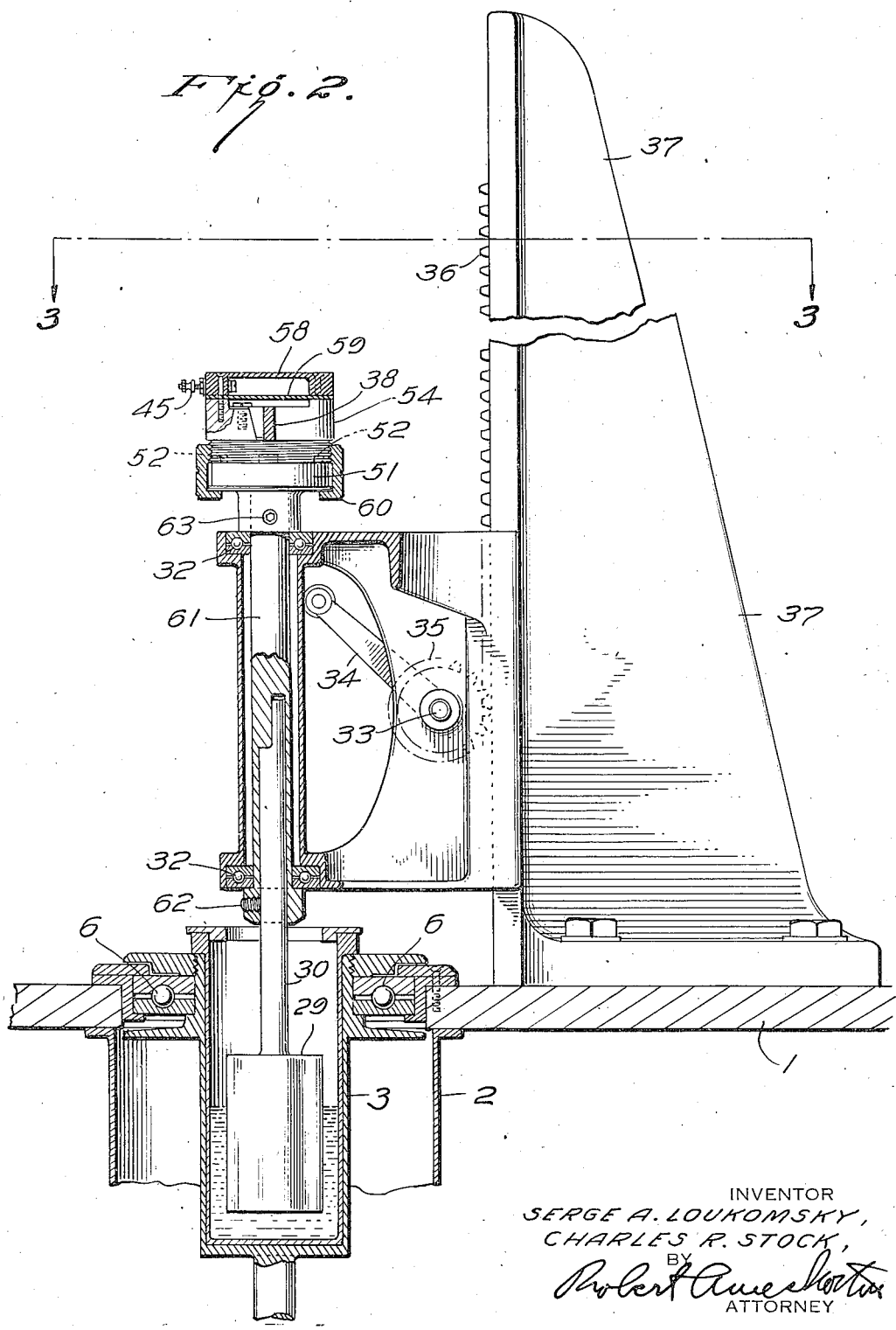

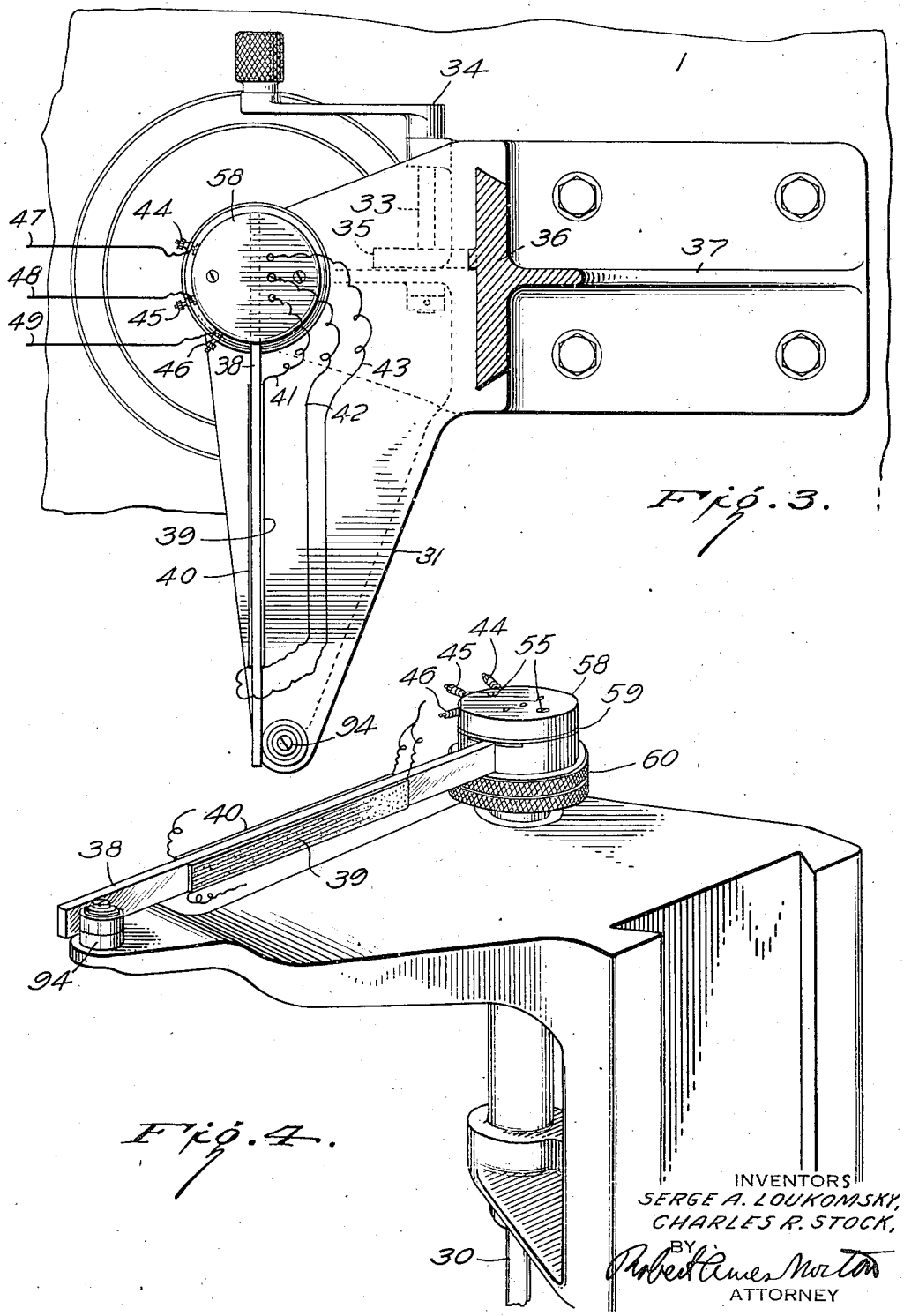

Oct. 29, 1946.  S. A. LOUKOMSKY ET AL  2,410,385
PLASTOMETER
Filed April 5, 1945  6 Sheets-Sheet 4
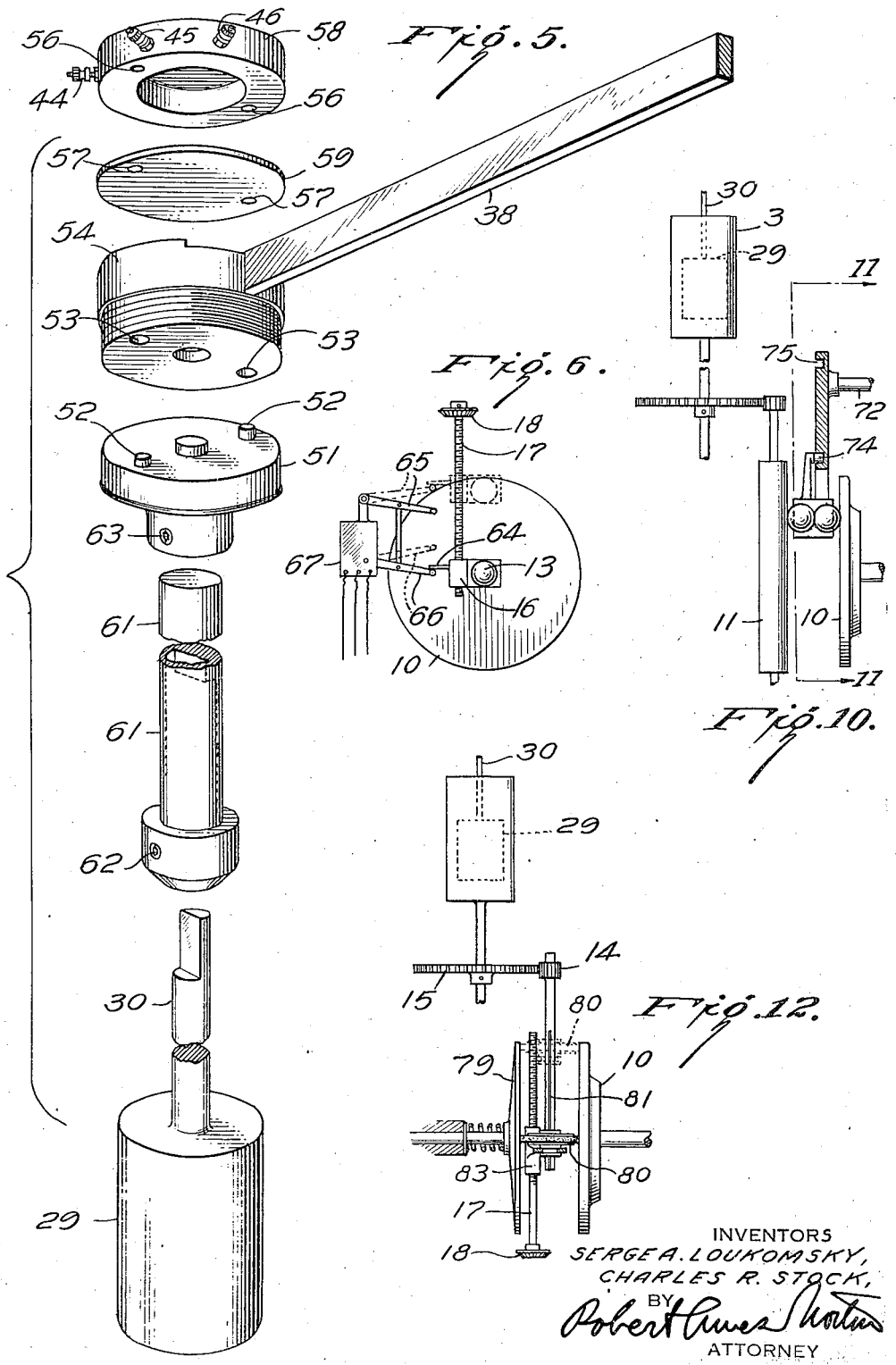
INVENTORS
SERGE A. LOUKOMSKY,
CHARLES R. STOCK,
BY
ATTORNEY

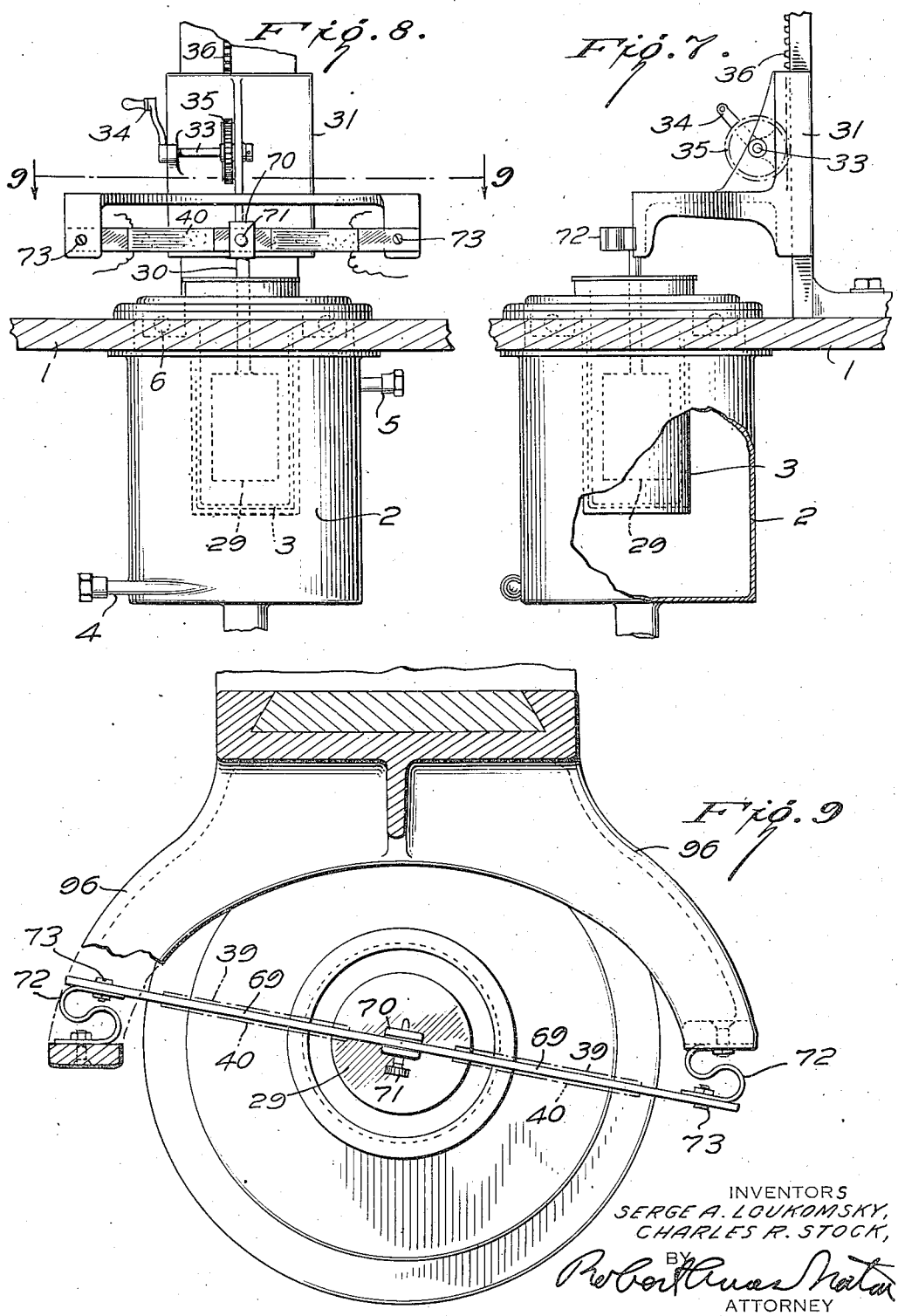

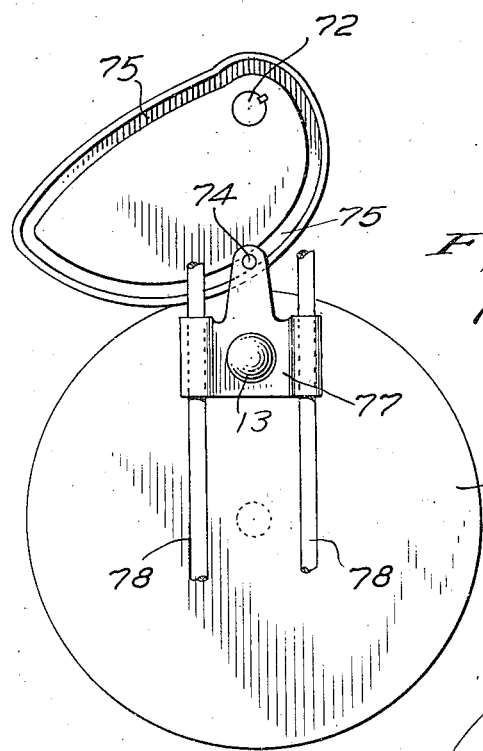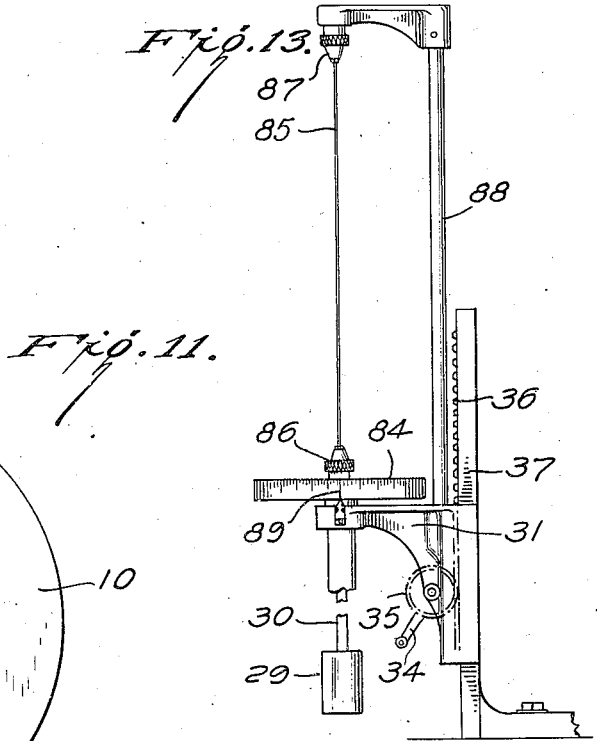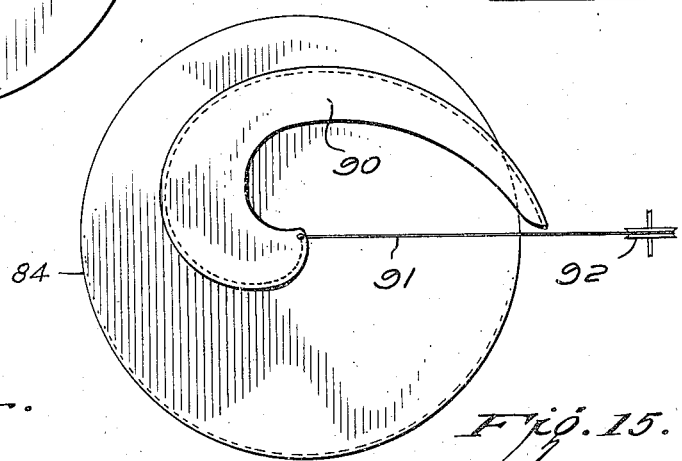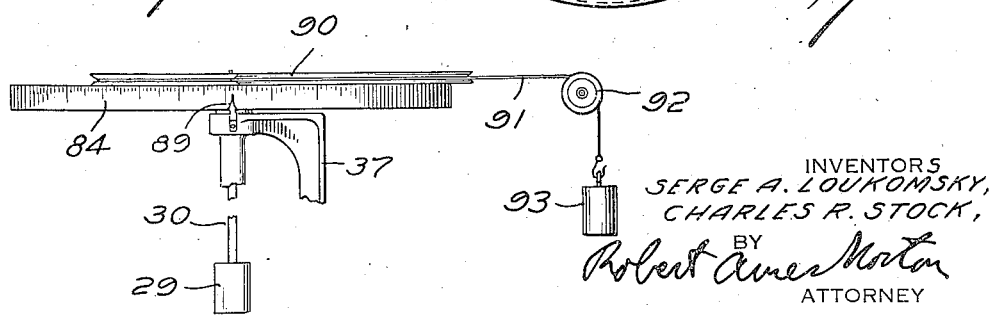

Patented Oct. 29, 1946

2,410,385

UNITED STATES PATENT OFFICE 2,410,385

PLASTOMETER

Serge A. Loukomsky, Bound Brook, N. J., and Charles R. Stock, Greenwich, Conn., assignors to American Cyanamid Company, New York, N. Y., a corporation of Maine Application April 5, 1945, Serial No. 586,782

6 Claims. (Cl. 73—59)

This invention relates to an improved recording viscosimeter or plastometer of the spinning cup type.

A type of viscosimeter for measuring materials having substantial viscosity, such as for example, viscosity in excess of five poises, has been developed in which there is provided a cup containing the fluid to be measured and attached to a vertical shaft which permits rotation at various speeds. Preferably the cup is surrounded by a thermostatting medium. In the center of the cup there is a cylinder on a vertical shaft, at the top of which there is provided a device for measuring torque, for example, a spring or twisted wire. The machine is usually provided with a manual device for varying the speed of rotation of the cup continuously from either zero or a predetermined minimum up to a predetermined maximum. For measurement of viscosity the machine gives very satisfactory service. However, it has disadvantages if it is desired to investigate changes of structure under shear, which is of considerable importance with many plastics that change their structure either permanently or temporarily when subjected to shearing action. In the spinning cup machines used hitherto this phenomenon is investigated by manually increasing the speed of the cup over a certain time, taking torque readings at different intervals to obtain a series of points from which a curve can be drawn. When the maximum speed has been reached the speed is then reduced, either at the same rate or at a more rapid rate, and readings taken at regular intervals, so that a curve can be plotted giving changes in torque with changes in speed during the reduction of speed from maximum to zero. If the substance under investigation changes its structure the two curves will normally not coincide and the differences give valuable information on structural changes in the plastic to be measured. As a research tool in skilled hands the machines have given accurate results. These results, however, are dependent entirely on the skill of the operator and they require not only a highly skilled operator but they require his presence throughout an entire measurement, and then curves have to be drawn from the readings, which takes further time, and unless the readings are made at very frequent intervals the curve shape may not be completely accurate. These disadvantages have militated considerably against the use of this type of machine where a large number of measurements have to be made.

The present invention deals with a machine of the spinning cup type in which the speed of rotation is automatically varied from a predetermined minimum or zero to a predetermined maximum through a selected time interval, and the speed is automatically then reduced back to the minimum either over the same interval or over a different interval. The operation is automatic and nonuniformity of speed changes due to inattention of the operator is entirely eliminated. When torque measuring devices are used which give an indication that must be read and recorded, the advantages of the present invention lie only in the uniformity of speed change. These advantages are very substantial but do not eliminate the use of an operator for taking readings. We prefer, therefore, to use a recording method in which a curve is drawn, both through the speed accelerating cycle and the speed decelerating cycle. The particular type of recording system for the preferred modification of the present invention is not limited to any single recorder or recorder type. However, we have found that best results are obtained when the torque controls the magnitude of electrical currents, which may be effected by an elastically deformable measuring member associated with electrical resistances which change with deformation. These currents may be used for actuation of automatic electrical recorders of conventional design, in which the changes in electrical current move a recording element, such as a pen, over the surface of a paper which is turned by a drum. The latter is preferably connected to the drive variation means so that its movement is proportional to the change in speed or rotation of the cup. The preferred electrical torque measuring system is not claimed per se in the present case. It is claimed in the present case only in combination with the automatic variation in rotational speed of the cup from minimum to maximum and back to minimum, which constitutes the broad inventive feature of the present invention.

It is an advantage of the present invention that it is not limited to a particular type of variable drive. Any variable drive which is capable of continuous variation from zero or a very low minimum up to a desired maximum may be used. Among such drives are those in which the driving member is a disc and the preferred member a wheel on a shaft at right angles thereto, capable of being moved across the face of the disc, differential pulleys, and the like. A type of drive which has been developed in recent years is particularly suitable and is preferred. In this drive the driving member is a disc and the driven member a cylinder having its axis at right angles to the axle of the disc. A suitable carriage provided with two balls in contact with each other is moved along the cylinder so that the balls can be moved from contact with the center of the disc out toward the periphery. This device permits a very smooth and continuous variation in speed and does not involve excessive friction, as the two balls roll readily across the disc. For the reasons of ruggedness, simplicity and lack of binding, this type of drive is preferred. The further description of the introductory portion of the present case will be made with respect to this preferred type of drive.

The movement of the carriage must be both precise and, in the case of long cycles, slow. This may be effected by a suitable motor, which may be a separate motor or the same motor driving the disc, through gearing to a threaded gear on a threaded shaft connected to the carriage. The whole device, of course, is provided with suitable reversing switches so that when it has reached the end of its travel corresponding to maximum speed, the motor or drive is reversed. Preferably a second limit switch is also provided which will shut off the motor when the cycle is complete. A very simple drive is possible where the period of acceleration is the same as the period of deceleration. In this case the same gear train is used and the motor is merely reversed. Various gear ratios may be selected for different time cycles. When it is desired to have different times for acceleration and deceleration, for example, a slow acceleration to permit time for molecular change under shear, and a rapid deceleration to avoid molecular change where the latter is restored fairly quickly, the drive is somewhat more complex, requiring the automatic interposition of a different time gear ratio in the accelerating cycle than in the decelerating cycle, which may be effected by known means, such as gear trains with ratchets and pawls operating in different directions. Another suitable method is by means of a cam which can move the carriage, the cam being provided with a profile which provides for very slow motion on the upward movement of the carriage with a relatively more rapid return. The cam drive has the advantage that any ratio of accelerating time to decelerating time may be chosen by a suitable cam. It is less desirable where different accelerating cycles are to be associated with a constant deceleration time, as this requires a number of cams and somewhat complicates the device.

When the preferred embodiment of the invention is used it involves an automatic recorder that draws the curves both of the accelerating and decelerating cycle. It is advantageous to drive the recording surface from the drive of the carriage through suitable transmission, such as a flexible shaft, or the like. The drive may be electrical, but in compact instruments this merely adds a further complication.

For certain purposes, namely, production operations, it may be desirable to test the plastics at or near the point of manufacture or processing, and the conditions obtaining at such points may be relatively unsuitable for precision instruments. For example, there may be problems introduced by vibration, corrosive vapors, dirt, and the like. It is possible when using the preferred embodiment of the present invention to have most of the device located at a distance, for example, in a central control office. It is only necessary that the spinning cup and the device for translating torque into electrical energy be located at the point where the plastic is to be tested. The changes in electrical conditions introduced by torque changes may of course be read at a distance in the conventional manner, the wires merely being extended to a recorder at a central place. The varying speed drive of the cup may also be determined from a central place by the well known electrical device of Selsyn drives. In such cases the speed variation at the central point turns the rotating elements of a Selsyn generator, which is connected by wires to Selsyn motors on each of the testing units. In this manner one drive speed varying device may be used to control a plurality of spinning cup instruments located at different points in a factory, and the electrical measurements of torque are similarly returned to a plurality of central recorders. It will be seen that the preferred modification of the present invention is very flexible. It may be used in single instruments or by remote control for a plurality of instruments. In either case the preferred modification permits results which are obtained automatically, do not depend on the skill of the operator, and do not require his supervision during the test. A higher degree of accuracy, instantaneous records at the end of the test, and saving of manpower are obtained. It is also possible to have permanent records which can be referred to for comparison purposes at any future time.

The driving energy for the spinning cup and for varying the speed of its rotation through the predetermined acceleration and deceleration cycles may be of any suitable form. For convenience, compactness, and reliability, electrical motors are preferred, although the invention is not broadly limited to their use. It is an advantage of the invention that many of the component parts may be of standard design. For example, standard designs of synchronous motors may be used, the recorder may be of the types which are available on the market and which require only minor modification, if any, in order to trace curves backward through the deceleration cycle. It is also possible when the preferred embodiment of electrical torque measurement is employed to vary the sensitivity without disconnecting or dismantling the machine. This is very simple, as the electrical recording device normally varies the resistance of two arms of a Wheatstone bridge. The sensitivity can be varied over a wide range by variation of the resistance in the other two arms or by using amplifiers of variable gain. It is thus possible to use one torque measuring element over a wide range of torques. Even with the possibility of variation in the sensitivity of the electrical circuit, it may be desirable to use different torque measuring elements when materials of very greatly different viscosity are to be measured. It is an advantage of the present invention, as will appear from the consideration of the description of typical embodiments of the machine below, that electrical torque measuring elements can be changed quickly, simply, and this is a further advantage of the preferred embodiment of the present invention.

The preferred torque measuring device has additional advantages in that it can be made extremely sensitive because a metal bar of the strain gage type, the deformation of which changes the resistance of the associated electric wires, is sufficiently strong so that the shaft and cylinder can be supported from it without requiring that the shaft be mounted in a framework with a bearing.

This permits an instrument in which the torque member has only elastic resistance to rotation of the cylinder and no friction is involved. Such an arrangement is capable of measuring the viscosity of liquids which is far below the capabilities of the ordinary types of instruments. For example, the measurements of very mobile liquids having viscosities of the order of water or alcohol are possible when no friction is involved. The device of the present invention is primarily used in measuring the viscosity changes in plastics. For this purpose the ultimate sensitivity is not necessary and in many cases it is possible to use devices employing a bearing. It is, however, an advantage of the preferred modification of the present invention that the machine is adapted for measuring viscosities in the low ranges.

The invention will be described in greater detail in connection with the drawings, in which:

Fig. 2 is an enlarged section along the line 2—2 of Fig. 1;

Fig. 3 is a horizontal section along the line 3—3 of Fig. 2;

Fig. 4 is an enlarged perspective of the torque measuring device shown in Figs. 1 to 3;

Fig. 5 is an exploded perspective of the parts of the torque measuring device shown in Figs. 1 to 4;

Fig. 6 is a detail of the variable drive showing the reversing mechanism;

Fig. 7 is a side elevation of a modified spinning cup and torque measuring device with all elastic support;

Fig. 8 is a front elevation of the modification shown in Fig. 7;

Fig. 9 is a horizontal section along the line 9—9 of Fig. 8;

Fig. 10 is a semi-diagrammatic elevation of a modified variable drive mechanism;

Fig. 11 is a vertical section along the line 11—11 of Fig. 10;

Fig. 12 is an elevation of a further modification of the variable drive;

Fig. 13 is an elevation of a modification employing a torque measuring element for visual indication;

Fig. 14 is a front elevation of a modified torque indicating mechanism, and

Fig. 15 is a plan view of the torque measuring device of Fig. 14.

Figure 1:
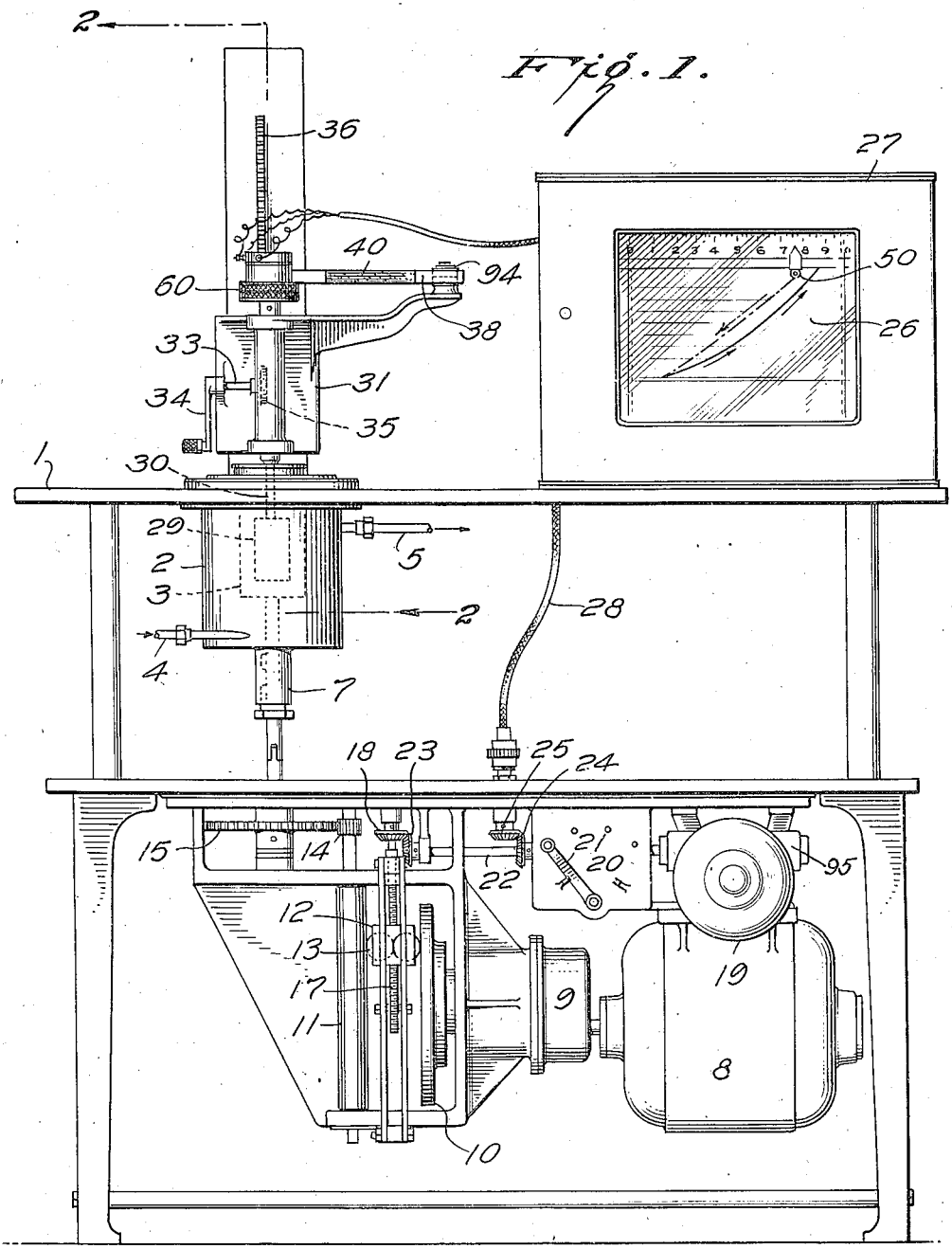
Fig. 1 is an elevation of a recording plastometer.

The plastometer as illustrated in Figs. 1 to 4 is mounted on a framework 7 which is rigid and may be advantageously made of metal. The framework carries at the top a metal plate, on the bottom side of which is mounted a chamber 2 containing a thermostatic liquid provided with an inlet pipe 4 and an outlet pipe 5. Within the thermostatic chamber there is mounted a spinning cup 3 rotated by a shaft 7. The cup is mounted on the top plate in ball bearings 6 (Fig. 2). Within the cup there is located a torque measuring cylinder 29 (Figs. 1 to 3) and the fluid, the viscosity of which is to be measured, is placed in the spinning cup as shown in Fig. 2. The design of spinning cup and torque measuring cylinder is conventional in spinning cup plastometers.

The variable drive for the shaft 7 which is shown in the Fig. 1 is provided with a drive motor 8 which drives a disk 10 through reducing gear box 9 of conventional design. The shaft 7 carries a spur gear 15 which meshes with a pinion 14 rotated by a roller 11 the axis of which is at right angles to the disk 10. The drive from the disk to the roller is through two steel balls 13 which are carried in a carriage 12 moving on guides 78. The carriage is provided with a threaded projection 16 engaging a threaded shaft 17 parallel to the axis of the roller 11 and provided at its top with a bevel pinion 14. The speed of rotation of the shaft 7 depends on the location of the steel balls with respect to the center of the driving disk 10. When these balls are at the center, the rotational speed of the roller 11 is zero. As the carriage 12 is moved out toward the periphery of the disk 10 the speed of rotation of the roller 11 increases to a maximum.

The movement of the carriage 12 and, therefore, the speed of rotation of the cup 3 is effected by a reversible motor 19 which drives a shaft 22 through a variable speed box 20 provided with a speed selection lever 21. As illustrated, the speed reducer is shown as capable of selecting four different speeds. The reduction is very great since the speed reducer is in series with a worm gear 95 providing a very great initial reduction. Shaft 22 carries a bevel gear 23 meshing with bevel gear 18 and the rotation of this shaft slowly moves the carriage 12. In a typical machine the overall speed reduction from the motor 19 to the carriage 12 including the fine pitch of the threaded shaft 17 (which may advantageously carry 40 threads to the inch) may vary from one minute for a carriage travel from zero speed to maximum to as much as 30 minutes for this same travel.

Preferably, the machine is provided with an automatic reversing gear. In order to keep the drawings clear, this mechanism is not shown in Fig. 1 but is shown diagrammatically in Fig. 6. It consists of a reversing and stop switch 67 of conventional design which controls the power supply for the motor 19. The device is started with a carriage 12 opposite the center of the disk 10. As the threaded shaft 17 turns, the carriage slowly moves out to an extreme position opposite the periphery of the disk 10 (shown in dotted lines in the Fig. 6). In this extreme position, which corresponds to maximum rotational speed of the roller 11, a projection 64 on the carriage 12 strikes an arm 65 which throws the reversing switch in the box 67, and causes the motor 19 to reverse its direction. This reverses the rotation of the threaded shaft 17 and causes the carriage 12 to move back toward the center of the disk 10 which is the position of zero speed for roller 11. At the end of its travel, the projection 65 strikes a second lever 66 which throws the reversing switch in box 67 and stops the machine.

The drive mechanism described above automatically increases the speed of the cup 3 to a predetermined maximum through a predetermined time interval determined by the choice of gear reduction in the gear box 20 and then reduces the speed back to zero. The gear ratio for the outward travel of the carriage 12 may be the same as the reverse travel or the latter may be at a higher rate of speed.

The modification shown in Fig. 1 is a recording plastometer and an ordinary electrical recorder 27 of standard design is readily adapted for use on the machine. This recorder is provided with a drum over which paper 26 is moved, and a pen 50 which is moved across the paper by a suitable galvanometer movement. In Fig. 1 the curve drawn during the acceleration cycle is shown in heavy lines and the curve which will be drawn during the remainder of the deceleration cycle is shown in dotted lines, arrows indicating the direction in both cases. As the variable drive increases speed from minimum to maximum and then reduces it back to minimum, it is desirable first to move the paper 26 in one direction and then move it back again. This is effected very simply by driving the paper moving mechanism of the recorder from the shaft 22 which is directly geared to the carriage moving screw. This takes place by providing a second double pinion 24 or shaft 22 meshing with a bevel pinion 25 which drives the paper moving mechanism of the recorder through the flexible shaft 28. It is thus unnecessary to provide special reversing mechanisms in the recorder as the paper is driven in both directions of the motor from the shaft 22 and its position in the recorder always corresponds to the position of the carriage 12 and, therefore, to the corresponding speed of rotation of the cup 3.

The viscosity or plasticity of the fluid to be tested is measured by the torque on the cylinder 29. Various torque measuring devices may be provided. Figs. 1 to 5 illustrate a rugged, reliable electric measuring device well suited for measuring liquids of substantial viscosity, for example, liquids having a viscosity of at least 4 to 5 poises.

The cylinder 29 is mounted on a shaft 30 provided with a flattened end, transmits rotation to a strain gage bar 38. The connections are more clearly shown in Fig. 5 which shows an exploded view of the individual parts.

The shaft 30 fits into an enlarged shaft 61 being clamped by a set screw 62. This enlarged shaft turns in ball bearings 32 mounted on a movable framework 31. The framework is rigid against side motion, but is capable of sliding up and down on a dove tailed rack 36 mounted on an extension 37 which is bolted to the top of a main framework 1. A pinion 35 is journalled in the framework 31 and provided with a short shaft 33 and crank 34. The teeth of the pinion engage the teeth of the rack 36 (Fig. 2).

The top of the shaft 61 fits into a collar on a round disk 51 mounted on the upper ball bearing and is held therein by the set screw 63. This disk is provided with a central cylindrical projection and two pins 52 at the periphery. These projections register with corresponding holes 53 in the head 54 of the strain gage. This head carries the strain gage bar 38 which bears against a roller 94 mounted on an extension of the framework 31 (Figs. 1, 3, and 4). The strain gage head is fastened to a flat plate 59 and an insulating ring 58 by means of screws 55 (Figs. 3 and 4) passing through holes 56 in the ring 58 and 57 in the plate (Fig. 5).

The strain gage bar 38 is provided with two resistances, 39 and 40 on its opposite sides. These resistances are connected in opposition through the wires 41, 42 and 43 to binding posts 44, 45, and 46. The two resistances thus form two arms of a conventional Wheatstone's bridge. To the bindingposts 44, 45 and 46 are attached three wires 47, 48 and 49 leading through a cable to the electrical circuit of the recorder 27. This is the conventional circuit with two resistances to complete the bridge circuit, and the source of electrical potential. The conventional galvanometer mechanism is across the bridge and moves the pen recorder 50.

In operation the liquid to be measured is introduced into the cup 3 at the temperature to be maintained by the thermostatic bath in the chamber 2. The crank 34 is then turned to lower the cylinder 29 into the cup, and the motor 19 started, the carriage 12, of course, being in the position for zero speed of rotation of the roller 11. As the motor 19 rotates the carriage 12 is slowly moved out toward the periphery of the driving disk 10 and the speed of rotation of the cup increases. At the same time, the paper 26 is moved down. The drag of the fluid in the cup 3 impresses a torque on the cylinder 29 which is imparted to the strain gage head 54. This attempts to rotate the strain gage but the end of the bar 38 can not move as it abuts against the roller stop 94. This results in bending the bar 38 somewhat which causes the resistance 39 to be increased, and the resistance 40 to be decreased, thus upsetting one pair of the Wheatstone's bridge, and causing the pen 50 to move in proportion to the change in resistance. As the speed of revolution of the cup increases, the torque also increases, and the pen 50 will draw a curve on the paper 26 the horizontal scale of which represents torque and the vertical scale speed of rotation since the latter is determined by the position of the carriage 12.

When the carriage 12 has moved out to the periphery of the disk 10 and has, therefore, produced maximum speed of rotation of the cup 3, it throws the reversing switch 67 (Fig. 6), as described above. This causes the motor 19 to reverse, the carriage 12 moves back, the paper 26 moves up and the speed of rotation of the cup 3 decreases from maximum to zero at which point the operation is halted by the throwing of the stop switch by means of lever 66. If there is no structural change in the fluid under shear, the curve on the paper 26 should be the same for both acceleration and deceleration cycles. When acceleration and deceleration of suitable time length are chosen, variations in the two curves will give an indication of the extent of structural change under shear in the fluid in the cup 3.

When different ranges of viscosity and plasticity are to be measured, it may be necessary to use strain gages of different rigidity and they are readily interchanged by merely loosening the knurled coupling 60 and disconnecting the wires from binding posts 44, 45, and 46. A different strain gage head is then slipped on to the disk 51 and the threaded coupling 60 screwed up. The three wires from the recorder are then connected to the binding posts of the strain gage and the instrument is then ready for measuring viscosities of a different range.

When it is desired to examine fluids having viscosities below 4 to 5 poises, the frictional resistance to rotation of the shaft 30, even when the ball bearings are used, may be of an order of magnitude comparable to the torque at low speeds of rotation of the cup 3. The modification shown in Figs. 1 to 5 is, therefore, not suitable for the measurement of such substances. For this purpose, a different modification is shown in Figs. 7 to 9 which illustrate the portion of the apparatus showing cup, cylinder and strain gage. In these figures the same parts bear the same reference numerals as in Figs. 1 to 5.

Instead of carrying the shaft 30 from the cylinder 29 up through ball bearings in the framework 31, the short shaft terminates in a fork 70 on which is mounted a balanced strain gage provided with two arms 69. It is clamped in place with a tapered pin 71 which passes through holes in the two tines of the fork, and the strain gage bar. The latter part is fixed at its ends to two stiff springs 72 by means of bolts 73. The springs 72 are carried by the horizontal arms 96 extending from the framework 31. The resistances 39 and 40 are arranged symmetrically on both arms of the strain gage. The strain gage provides a reasonably rigid mounting for cylinder 29 which is thereby accurately centered in the cup 3. However, there is no rotational friction involved in the whole torque measuring device, the mounting is all elastic, and is, therefore, capable of measuring torques no matter how small. With the modification of Figs. 7 to 9, therefore, it is possible to measure the viscosity of fluids which are not sufficiently viscous to permit measurement in the modifications shown in Figs. 1 to 5. The higher sensitivity is obtained at the expense of somewhat decreased ruggedness and ease of changing the strain gages.

The variable drive mechanism shown in Fig. 1 presents many advantages. Its design has been worked out in many instruments and it is very rugged and reliable. However, other types of variable drives are applicable to the instruments of the present invention. For example, the type of drive using a roller and driving disk illustrated in Figs. 1 and 6 employs a threaded shaft to move the carriage containing the two steel balls. A different method of moving the carriage is illustrated in Figs. 10 and 11 in which the same parts bear the same reference numerals as in Figs. 1 and 6. In this modification instead of using a threaded shaft, the carriage 12 is provided with a projecting roller 74 which fits in a groove 75 of a cam 76 turned by the shaft 22. As a single revolution of the shaft completes the in and out cycle, a correspondingly greater gear reduction between the motor and shaft 22 is necessary. The cam may be symmetrical. However, this type of drive lends itself to acceleration and deceleration cycles which are not of the same length, and a cam is illustrated in which the acceleration cycle is quite long and the deceleration cycle is much shorter. Thus, for example, the acceleration cycle covers about 270° of revolution, whereas the deceleration cycle is effected in about 90° making a deceleration cycle about one third of the acceleration cycle.

The use of a very short deceleration cycle is of importance where the change in molecular structure under shear of the fluid being investigated is a fairly rapidly reversible one. In such cases if the deceleration cycle is as slow as the acceleration cycle, the material may have returned to its original molecular structure during the deceleration cycle, and the curves drawn by the machine would appear to indicate that the material did not undergo molecular change under shear or that it did not exhibit as great a change as actually does take place. With such materials, a machine having a short deceleration cycle is necessary. The simplest drive providing sufficiently short deceleration cycles is a cam as described above. Of course, the gear box 20 may be provided with overrunning clutch and a different gear ratio on reverse travel. Such gear boxes are well known speed reducing mechanisms but are more complicated than a simple cam. On the other hand, the modification described in Figs. 10 and 11 does not lend itself readily to various acceleration and deceleration cycles, as it is necessary to use a different cam for each pair of cycle lengths. It is not very difficult to unclamp one cam and clamp on another but the operation is not as quick and convenient as the mere shifting of the gear shift lever, as in the modification shown in Fig. 1.

Another type of variable speed drive is illustrated in Fig. 12 which, as in the case of Figs. 6, 10 and 11, the same parts bear the same reference numerals. In the drive shown in Fig. 12, the driving disk 10 engages a wheel 80 with an outer edge of material having a suitable coefficient of friction. This wheel is movable on a splined shaft 81 at right angles to the shaft driving the disk 10, contact with the disk 10 is maintained by a spring pressed idler disk 79. The splined shaft drives the pinion 14 which in turn rotates the shaft carrying the cup 3 as in the modification of Fig. 1. The movable wheel 80 is provided with a collar carrying a threaded portion 83 in which the threaded shaft 17 turns. This shaft, which carries bevel pinion 18, is driven from the shaft 22 (not shown) as in Fig. 1. In fact the drive modification of Fig. 12 merely takes the place of the carriage 12 with steel balls and the roller 11 in the drive mechanism of Fig. 1, the other elements are the same. The movement of the wheel from the center of the disk 10 where its rotational speed is zero to the periphery where maximum speed results, gives a variation which is exactly the same as the drive shown in Figs. 1. Automatic reversal and stopping can be effected by the wheel in precisely the same manner as is illustrated in Fig. 6. The stop and reversing switch are not shown as the figure is a diagrammatic one.

The electrical measurement of torque presents many advantages, and is the preferred modification of the present invention. It permits ready recording, and can be designed to give extreme sensitivity for low viscosity measurements. However, the variable drive features of the present invention are not limited to use with an instrument in which torque is measured electrically by means of strain gages or similar mechanisms. Nor is the invention limited to instruments which provide automatic records changes of torque with speed during the acceleration and deceleration cycles. For some purposes, an automatic recording machine is not necessary, and the advantages of accurately predetermined acceleration and deceleration cycles are applicable to instruments which have the conventional torsion torque measuring mechanisms. Fig. 13 illustrates a typical torque measuring mechanism of this type applied to machines of the present invention the same parts bear the same reference numerals.

The movable framework 31 is similar in its general shape to that shown in Figs. 1 to 4 but is additionally provided with a pillar 88 and a fixed pointer 89. The shaft 30 carries an inverted disk 84, the outer surface of which is provided with a scale moving over the pointer 89. On top of the scale disk is a clutch 86 and the column 88 at its top carries an arm with a similar clutch 87. These two clutches can grip a torsion ribbon 85 or a torsion spring. The operation of the machine is similar to those of standard spinning cup viscosimeters. As the cup increases its speed, the torque on the shaft 30 increases and this causes a twisting of the torsion member 85 until a balance is reached. The torque may be read on the scale on the disk 84 and will, of course, increase with increasing speeds during the acceleration cycle. The modification shown does not provide for an automatic record, but the operation of the acceleration and deceleration cycle is the same.

The torsion torque measuring device shown in Fig. 13 is somewhat cheaper than the electrical devices shown in Figs. 1 to 5 and 7 to 9; however, it presents disadvantages. In the first place, the range is small and with a material of high viscosity it is necessary to use a very stiff torsion ribbon or spring which makes the readings at the beginning of the accelerator cycle less accurate. It is also necessary to use a different torsion element when fluids of different viscosity ranges is to be investigated. It is true that with the electrical strain gage, it is sometimes necessary to change gages when viscosity ranges of the fluids vary greatly. However, the range of the different strain gages is greater than that of the torsion element shown in Fig. 13. However, for the operation with fluids whose viscosity ranges are not excessive, the modification of Fig. 13 permit a very cheap and useful device.

Figs. 14 and 15 show another mechanical torque measuring device. In this device a disk 84 is provided in the shaft 30 just as in Fig. 13. The disk carries a cam 90 with a grooved face. The profile of the cam starting at the center of the disk as an origin is preferably developed with a profile which is an ordinary spiral. A cord 91 is attached to the center of the disk and fits in the groove of the cam. It passes out over a pulley 92 and carries at its end a removable weight 93.

When the machine is in operation as the spinning cup accelerates torque increases, the disk 84 starts turning in a counterclockwise direction and the cam proceeds to wind up the cord. As it turns the profile of the cam goes away from the center and the lever arm therefore increases so that the disk turns to a point where the pull of the weight 93 multiplied by the lever arm corresponding to the rotation just equals the torque. Torque is read on the scale of the disk 84 with the pointer 89 as described in conjunction with Fig. 13. This is perhaps the cheapest simple torque measuring device. It has the advantage that different ranges may be chosen by simply hooking different weights on the cord. It has the disadvantage that its range with any particular weight is limited by the radius of the disk 84 which fixes the maximum lever arm available when the disk has made one complete rotation. As there is a very definite limit on the size of disks which can be conveniently incorporated in a spinning cup viscosimeter this lack of range must be considered as a drawback to the very simple and cheap modification shown in Figs. 14 and 15 and in this respect it is definitely inferior to the electrical recording instruments shown in Figs. 1 to 5 and 7 to 9. On the other hand, it is quite possible to produce recording instruments with the torque measuring device of Figs. 14 and 15 because the movement of the cord 91 can be caused to move a pen over a recording surface in a conventional type of recorder.

The torque measuring devices of Figs. 13 to 15 require that the shaft 30 be journalled in bearings to prevent sidewise movement. They are, therefore, limited to the testing of materials having sufficient viscosity to supply the necessary torque to overcome bearing friction. In this respect they have the same limitations as the electrical instruments shown in Figs. 1 to 5 and can not measure fluids having very low viscosities as is possible with the electrical modifications shown in Figs. 7 to 9.

The invention has been shown with a few typical variable drives and with three types of torque measuring devices. These are not the only elements which will provide the acceleration and deceleration cycles and torque measurement and intended to be illustrative only. In its broader aspects the invention is not limited to the details of these elements, but includes any suitable drives capable of performing the functions of the machine of the present invention.

We claim:

1. An improved viscosimeter of the spinning cup type comprising in combination a vertical shaft, a cup mounted thereon, a second vertical shaft extending into the center of the cup, a cylindrical element mounted vertically on said second vertical shaft at the end extending into the cup, said latter shaft being rotatably mounted and being provided with a torque measuring device, driving means, a continuously variable drive interconnecting said driving means to the cup shaft, means for varying the ratio of the drive from a predetermined minimum cup speed to a predetermined maximum through a predetermined time interval, automatic reversing means actuated when the speed of the cup reaches the predetermined maximum, said automatic means actuating means which vary the drive ratio so that the cup speed decreases from the maximum to the minimum through a predetermined time interval.

2. An improved viscosimeter of the spinning cup type comprising in combination a vertical shaft, a cup mounted thereon, a second vertical shaft extending into the center of the cup, a cylindrical element mounted vertically on said second vertical shaft at the end extending into the cup, said latter shaft being rotatably mounted and being provided with a torque measuring device, driving means, a continuously variable drive interconnecting said driving means to the cup shaft, electrically driven means for varying the ratio of the drive from a predetermined minimum cup speed to a predetermined maximum through a predetermined time interval, automatic means for reversing the rotation of the electrical driving means whereby the speed of the cup is decreased from the maximum to the minimum through a predetermined time interval.

3. An improved viscosimeter of the spinning cup type comprising in combination a vertical shaft, a cup mounted thereon, a second vertical shaft extending into the center of the cup, a cylindrical element mounted vertically on said second vertical shaft at the end extending into the cup, said latter shaft being rotatably mounted and being provided with a torque measuring device capable of translating torque into electric energy, driving means, a continuously variable drive interconnecting said driving means to the cup shaft, means for varying the ratio of the drive from a predetermined minimum cup speed to a predetermined maximum through a predetermined time interval, automatic reversing means actuated when the speed of the cup reaches the predetermined maximum, said automatic means actuating means which vary the drive ratio so that the cup speed decreases from the maximum to the minimum through a predetermined time interval.

4. An improved viscosimeter of the spinning cup type comprising in combination a vertical shaft, a cup mounted thereon, a second vertical shaft extending into the center of the cup, a cylindrical element mounted vertically on said second vertical shaft at the end extending into the cup, said latter shaft being rotatably mounted and being provided with a torque measuring device capable of translating torque into electric energy, driving means, a continuously variable drive interconnecting said driving means to the cup shaft, electrically driven means for varying the ratio of the drive from a predetermined minimum cup speed to a predetermined maximum through a predetermined time interval, automatic means for reversing the rotation of the electrical driving means whereby the speed of the cup is decreased from the maximum to the minimum through a predetermined time interval.

5. An improved viscosimeter of the spinning cup type comprising in combination a vertical shaft, a cup mounted thereon, a second vertical shaft extending into the center of the cup, a cylindrical element mounted vertically on said second vertical shaft at the end extending into the cup, said latter shaft being rotatably mounted and being provided with a torque measuring device capable of translating torque into electric energy, driving means, a continuously variable drive interconnecting said driving means to the cup shaft, means for varying the ratio of the drive from a predetermined minimum cup speed to a predetermined maximum through a predetermined time interval, automatic reversing means actuated when the speed of the cup reaches the predetermined maximum, said automatic means actuating means which vary the drive ratio so that the cup speed decreases from the maximum to the minimum through a predetermined time interval, and a recorder provided with a moving surface and a recording element, the former being moved in one direction throughout the acceleration cycle of cup speed and in a reverse direction through the same distance throughout the deceleration cycle, the recording element moving over the recording surface in proportion to the electric energy from the torque measuring device.

6. An improved viscosimeter of the spinning cup type comprising in combination a vertical shaft, a cup mounted thereon, a second vertical shaft extending into the center of the cup, a cylindrical element mounted vertically on said second vertical shaft at the end extending into the cup, said latter shaft being rotatably mounted and being provided with a torque measuring device capable of translating torque into electric energy, driving means, a continuously variable drive interconnecting said driving means to the cup shaft, electrically driven means for varying the ratio of the drive from a predetermined minimum cup speed to a predetermined maximum through a predetermined time interval, automatic means for reversing the rotation of the electrical driving means whereby the speed of the cup is decreased from the maximum to the minimum through a predetermined time interval, and a recorder provided with a moving surface and a recording element, the former being moved in one direction throughout the acceleration cycle of cup speed and in a reverse direction through the same distance throughout the deceleration cycle, the recording element moving over the recording surface in proportion to a predetermined function of the electric output from the torque measuring device.

SERGE A. LOUKOMSKY.
CHARLES R. STOCK.